US012758864B2

(12) United States Patent
Sakurai

(10) Patent No.: US 12,758,864 B2
(45) Date of Patent: Oct. 13, 2026

(54) STEP DETECTION UNIT

(71) Applicant: Eizo Sakurai, Chiba (JP)

(72) Inventor: Eizo Sakurai, Chiba (JP)

( * ) Notice: Subject to any disclaimer, the term of this patent is extended or adjusted under 35 U.S.C. 154(b) by 216 days.

(21) Appl. No.: 18/575,547

(22) PCT Filed: Oct. 11, 2022

(86) PCT No.: PCT/JP2022/037906

§ 371 (c)(1),
(2) Date: Mar. 21, 2024

(87) PCT Pub. No.: WO2023/068114

PCT Pub. Date: Apr. 27, 2023

(65) Prior Publication Data

US 2024/0374991 A1 Nov. 14, 2024

(30) Foreign Application Priority Data

Oct. 19, 2021 (JP) ................................ 2021-170642

(51) Int. Cl.
*A63F 13/214* (2014.01)
*A63F 13/212* (2014.01)
*A63F 13/213* (2014.01)
*A63F 13/218* (2014.01)
(Continued)

(52) U.S. Cl.
CPC .......... *A63F 13/214* (2014.09); *A63F 13/212* (2014.09); *A63F 13/213* (2014.09);
(Continued)

(58) Field of Classification Search
None
See application file for complete search history.

(56) References Cited

U.S. PATENT DOCUMENTS 6,001,017 A * 12/1999 Okano .................. A63F 13/245
463/31
2007/0105629 A1 5/2007 Toyama
(Continued)

FOREIGN PATENT DOCUMENTS

JP 07-208944 A 8/1995
JP 2002-165912 A 6/2002
(Continued)

OTHER PUBLICATIONS

International Search Report and Written Opinion received for PCT Patent Application No. PCT/JP2022/037906, mailed on Dec. 20, 2022, 11 pages (3 pages of English Translation and 8 pages of Original Document).

*Primary Examiner* — Jason T Yen

(74) *Attorney, Agent, or Firm* — Faegre Drinker Biddle & Reath LLP

(57) ABSTRACT

There is provided a matless step detection unit for a game improved in portability, storability, and detection accuracy. The detection unit uses sensors to detect a step in a dance game in a non-contact manner, and delivers information on the detected step to a network, thereby enabling a dance game to be enjoyed on a smart device or a game terminal. A step information reception unit having a rectangular frame structure enables a step detection game to be played in various forms, by a structure in which coupling portions of sides are coupled by parts or contacts, for example, hinges.

8 Claims, 21 Drawing Sheets

(51) Int. Cl.

| | |
|---|---|
| ***A63F 13/235*** | (2014.01) |
| ***A63F 13/245*** | (2014.01) |
| ***A63F 13/428*** | (2014.01) |
| ***A63F 13/44*** | (2014.01) |
| ***A63F 13/814*** | (2014.01) |

(52) U.S. Cl.

CPC .......... *A63F 13/218* (2014.09); *A63F 13/235* (2014.09); *A63F 13/245* (2014.09); *A63F 13/428* (2014.09); *A63F 13/44* (2014.09); *A63F 13/814* (2014.09)

(56) References Cited

U.S. PATENT DOCUMENTS

| | | | | |
|---|---|---|---|---|
| 2008/0004111 | A1* | 1/2008 | Prather | A63F 13/245 463/36 |
| 2008/0146329 | A1 | 6/2008 | Kodama et al. | |
| 2012/0016624 | A1* | 1/2012 | Caritu | G06F 3/0346 702/141 |
| 2016/0361643 | A1* | 12/2016 | Allin | A63F 13/5255 |
| 2022/0044038 | A1* | 2/2022 | Mizuno | G06Q 30/0269 |

FOREIGN PATENT DOCUMENTS

| | | | |
|---|---|---|---|
| JP | 2006-247258 | A | 9/2006 |
| JP | 2006-346323 | A | 12/2006 |
| JP | 2007-125251 | A | 5/2007 |
| JP | 2007-275422 | A | 10/2007 |
| JP | 2012-520493 | A | 9/2012 |
| JP | 2020-044353 | A | 3/2020 |
| WO | 2007/077851 | A1 | 7/2007 |
| WO | 2008/061023 | A2 | 5/2008 |

* cited by examiner

FIG. 7-a
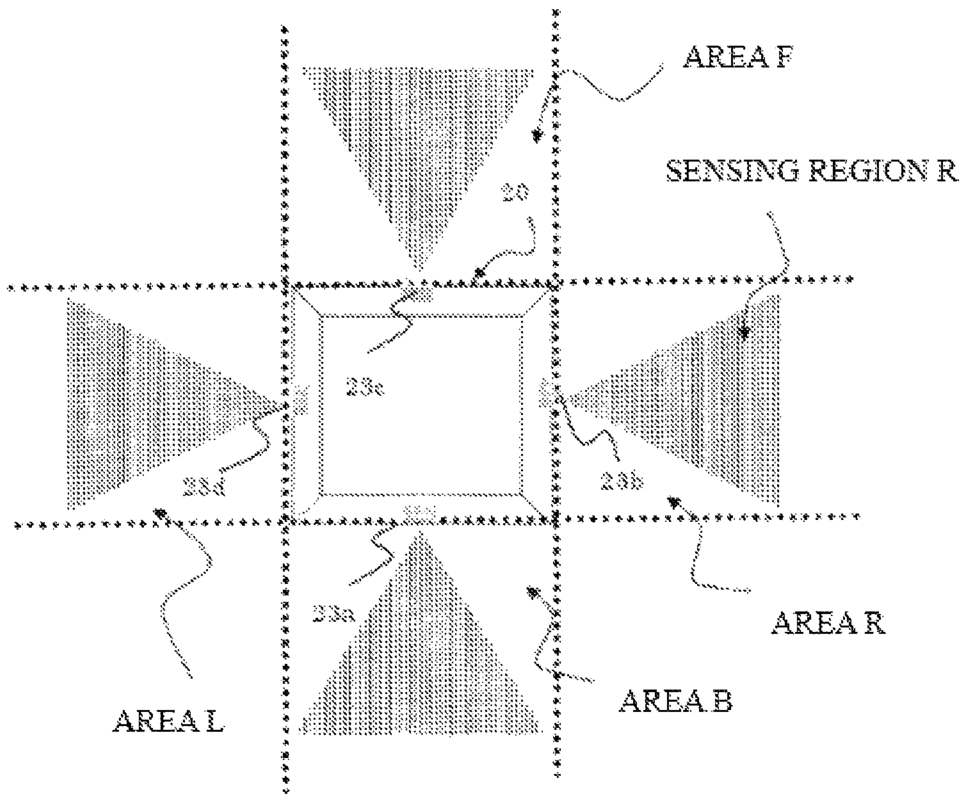

FIG. 7-b
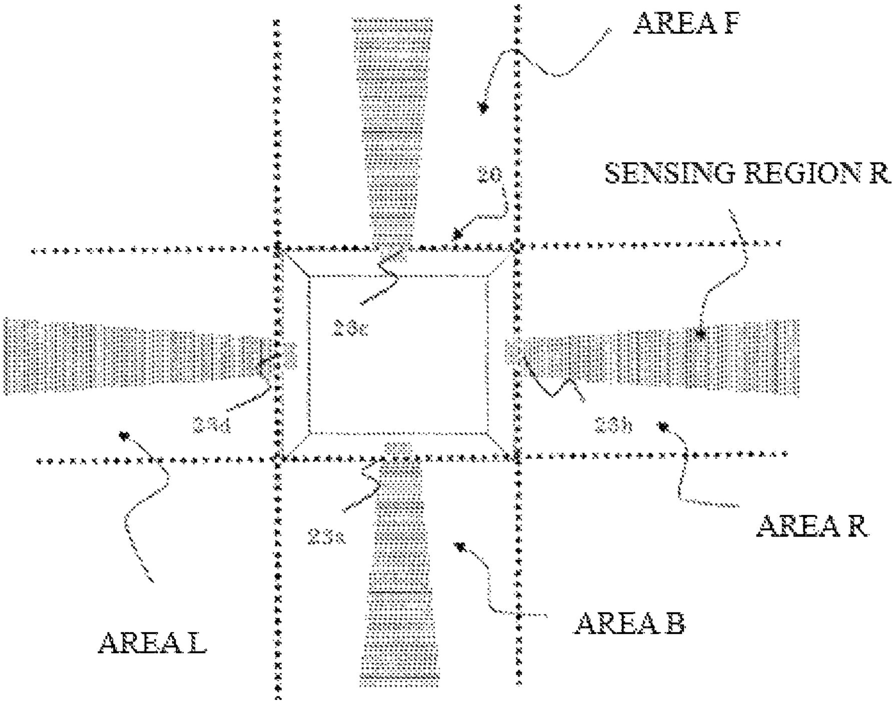

STEP DETECTION UNIT

CROSS-REFERENCE TO PRIOR APPLICATION

This application is a § 371 National Stage Application of PCT International Application No. PCT/JP2022/037906 filed Oct. 11, 2022, which claims the priority of Japanese Patent Application No. 2021-170642, filed Oct. 19, 2021, each of which are herein incorporated by reference in their entirety.

TECHNICAL FIELD

The present invention relates to a matless step detection unit for a game in which a player steps and dances.

BACKGROUND ART

In an arcade game and a home video game machine, a game in which a player dances to a tune of a music piece is known. In the game, the player steps on integrated or attached panels to the tune of the music piece and in response to instructions on a screen, and success or failure of rhythmical steps is judged. More specifically, when performance of a selected music piece starts, for example, an arrow object flows on a game screen. The player steps on the panel in an instructed direction at a timing when the arrow object overlaps with a step zone (determination position). In a case where two arrow objects appear at the same time, the player jumps and steps on two panels at the same time (for example, see Patent Literature 1).

CITATION LIST

Patent Literature

Patent Literature 1: JP 3815938 B2
Patent Literature 2: US 20080039199 A1
Patent Literature 3: US 20080004111 A1

SUMMARY OF INVENTION

Technical Problem

In recent years, a game can be played on a mobile terminal including a game application, such as a smart phone and a tablet terminal serving as a game device. Such terminals high in portability enables the player to play the game at any place such as a friend home and outdoors.

In a case of the invention disclosed in Patent Literature 1 described above, however, it is difficult for the player to play the game at any place because of difficulty in portability (for example, see FIG. 1, etc. in Patent Literature 1). Further, in the case of the invention disclosed in Patent Literature 1 described above, an infrared ray sensor is directed to an upper (vertical) direction. The infrared ray sensor detects operation when the player puts out a foot to outside of a player area. The sensor detects operation when the player only puts out the foot to outside of the player area. Therefore, the operation is detected even in a case where the player does not surely steps. Therefore, this is not suitable for the game in which the player steps and dances.

In a case of the inventions disclosed in Patent Literature 2 and Patent Literature 3 described above, not a step when the foot of the player contacts a ground surface, but a state where the foot is detected in a sensing region of a sensor is detected as a step. The sensing region of the sensor generally tends to diffuse. Therefore, even in a case where the foot of the player does not completely contact the ground surface, the sensor tends to detect the state as the step. Therefore, it is difficult to enhance accuracy of step detection. In a game requiring a step at a determined position at a correct timing, low accuracy of step detection reduces quality of game experience for the user.

It is anticipated that a device disclosed in each of Patent Literature 2 and Patent Literature 3 described above has a shape close to a square shape in which a length of one side is about 30 cm. In this case, the device is too low in portability to be put in a bag and carried, and cannot have high storability enough to be stored in a drawer of a desk or the like.

The present invention is proposed in consideration of the above-described circumstances, and an object of one aspect is to provide a matless step detection unit for a game improved in portability, storability, and detection accuracy.

Solution to Problem

To solve the above-described issues, a step detection unit according to the present invention includes a signal detection mode and an object detection mode. In the signal detection mode, the step detection unit includes step information transmission units 30 individually mounted on respective legs of a player, each configured to measure, by a built-in sensor such as an acceleration sensor, acceleration, vibration, or impact generated when the player steps and a foot contacts a floor surface or a ground surface, and configured to transmit a step detection signal, for example, light in a case where a result of the measurement is a level corresponding to a step; and a step information reception unit 20 including sensing regions for detecting spaces extending within certain ranges from one or more sensors provided on sides of an outer peripheral portion of a polygonal housing disposed on the floor surface or the ground surface. When the step detection signal transmitted from the step information transmission unit 30 when the player steps in an area corresponding to any of the sensing regions is detected in the sensing region on the outer peripheral portion of the step information reception unit 20, it is detected that the player steps in that area. The step detection unit includes a communication means configured to transmit step detection information including a detection result of the step detection signal and a position of a step detection area, to a game device 10 through a network 40 by using a communication function incorporated in the step information reception unit 20. In the object detection mode, when the foot enters any of the sensing regions of the step information reception unit 20, it is detected that the player steps in that area. The step detection unit includes the communication means configured to transmit the step detection information including the detection result and the position of the step detection area to the game device 10 through the network 40, by the communication function incorporated in the step information reception unit 20.

To solve the above-described issues, the step detection unit according to the present invention further includes a detection information notification unit as a terminal electrically connected to the step information reception unit 20 by a cable, and configured to notify the step detection information including the detection result of the step detection signal by any of the sensors provided on the sides of the outer peripheral portion of the step information reception unit 20 and the position of the detection area corresponding to the sensing region of the sensor, by visible information such as lighting of a light-emitting element and digital display, or by invisible information such as radio waves. Notification of the detection information notification unit by the visible information is monitored by a camera of a smart device, and image recognition of the visible information is performed by a dedicated application or software installed in the smart device, or the invisible information is monitored by the dedicated application or software installed in the smart device. Thus, the step detection information notified by the detection information notification unit is transmitted to the game device 10 through the network 40 by using a communication function held by the smart device.

To solve the above-described issues, in the step detection unit according to the present invention, the step information reception unit 20 has a structure in which the sides are formed of independent parts and coupling portions of the parts of the respective sides are coupled by parts or contacts, for example, hinges, and the structure is deformable to an optional shape such as a linear shape and an L-shape. This makes it possible to enable the player to play the game with the sensing regions having different shapes by one device. Further, since the step information reception unit 20 has a foldable structure, the product is enhanced in storability and portability. In a case where the shape is changed to the linear shape, each of the sensing regions of the step information reception unit 20 does not interfere with the sensing region of another area.

The step detection unit includes the step information reception unit 20 in which a lens is mounted on each of the sensors 23 to converge the diffusing sensing region and to form the sensing region close to a linear shape as viewed from a side, in an area where the player steps.

Advantageous Effects by Invention

According to the embodiment of the present invention, it is possible to provide the step detection unit for a game improved in portability, storability, and detection accuracy, as a portable inexpensive product.

BRIEF DESCRIPTION OF DRAWINGS

FIG. 7-*a* is a diagram illustrating wide sensing regions by the step information reception unit.

FIG. 7-*b* is a diagram illustrating narrow sensing regions by the step information reception unit.

DESCRIPTION OF EMBODIMENT

An embodiment of the present invention is described in detail with reference to drawings.

<System Configuration>

Figure 1:
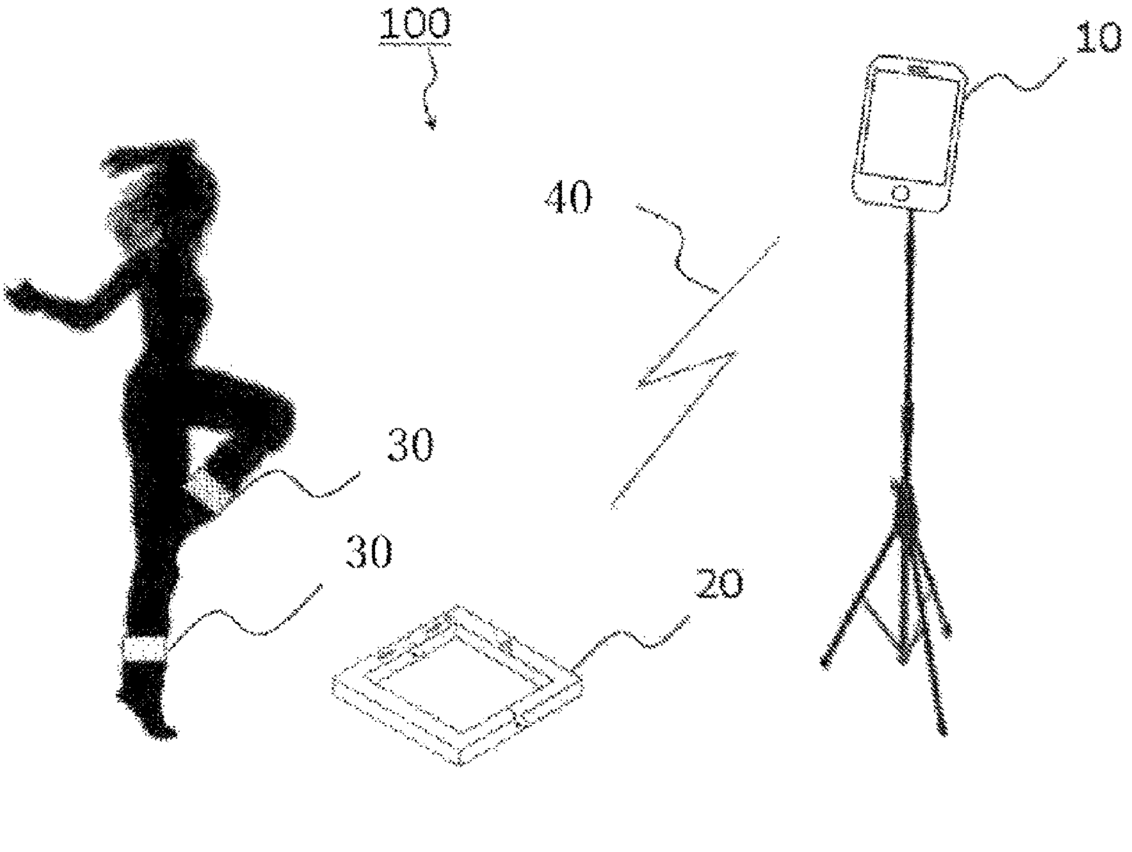
FIG. 1 is a diagram illustrating a configuration example of a game system.

FIG. 1 is a diagram illustrating a configuration example of a game system according to the present embodiment. A game system 100 in FIG. 1 includes a game device 10, a step information reception unit 20, and step information transmission units 30 that are connected to one another through a network 40.

The game device 10 is a device for a game in which a player dances to a tune of a music piece. When performance of a music piece selected by the player starts, for example, an arrow object flows on a game screen. The player steps in an indicated direction at a timing when the arrow object overlaps with a step zone (determination position). In the game, a point is added every time the player steps on a correct position at an appropriate timing.

The game device 10 can be realized by, for example, a smart phone, a tablet terminal, a personal computer, or a TV (television) including a game application. Further, the game device 10 may be a home video game machine, and a TV (television) or a monitor connected to the home video game machine.

The system includes a signal detection mode and an object detection mode. In the signal detection mode, the system includes two devices, namely, the step information reception unit 20 and the step information transmission units 30. The step information reception unit 20 is disposed on a ground surface or a floor surface, has a polygonal shape and includes one or more sensors on each of sides of an outer peripheral portion, and includes sensing regions extending within certain ranges from the outer peripheral portion. The step information transmission units 30 are mounted on respective legs of the player, and each transmit a step detection signal when detecting acceleration, vibration, or impact corresponding to a step. When the step detection signal transmitted from the step information transmission unit 30 is received by any of the sensing region of the outer peripheral portion of the step information reception unit 20, it is detected that the player has stepped. In the object detection mode, the system includes only the step information reception unit 20. When the foot enters any of the sensing regions of the outer peripheral portion of the step information reception unit 20, it is detected that the player has stepped. As the system of the device, in a manufacturing stage, one of the signal detection mode and the object detection mode is selected, or both modes are incorporated.

The step information transmission units 30 are device units individually mounted on the respective legs of the player. Each step information transmission unit 30 measures acceleration, vibration, or impact generated when the player steps and a corresponding foot contacts the ground surface, by a sensor such as an acceleration sensor. In a case where a result of the measurement is a level corresponding to a step, the step information transmission unit 30 transmits a step detection signal, for example, light.

The step information reception unit 20 is a device unit disposed on the floor surface or the ground surface, and includes the sensing regions for detecting spaces extending within the certain ranges from the one or more sensors provided on the sides of the outer peripheral portion of a polygonal housing. The sensing regions include sensing regions in a horizontal direction and a vertical direction illustrated by hatching in FIG. 7 and FIG. 8. The sensing regions are changed depending on sensor devices and structures around the sensors. In the signal detection mode, when the player steps in an area corresponding to any of the sensing regions, the step information reception unit 20 detects the step detection signal transmitted from the step information transmission unit 30 mounted on the stepping leg of the player at the time of detecting the step, and transmits step detection information including a detection result of the step detection signal and a position of the step detection area, to the game device 10 through the network 40, by a communication function incorporated in the step information reception unit 20. In the object detection mode, the step information reception unit 20 detects a step when the foot enters any of the sensing regions, and transmits the step detection information including the detection result of the step detection signal and the position of the step detection area, to the game device 10 through the network 40, by the communication function incorporated in the step information reception unit 20.

The network 40 is a communication network including a wired network and a wireless network. The network 40 is, for example, short-range wireless communication such as Bluetooth®, or WiFi®.

<Step Information Transmission Unit>

Figure 2:
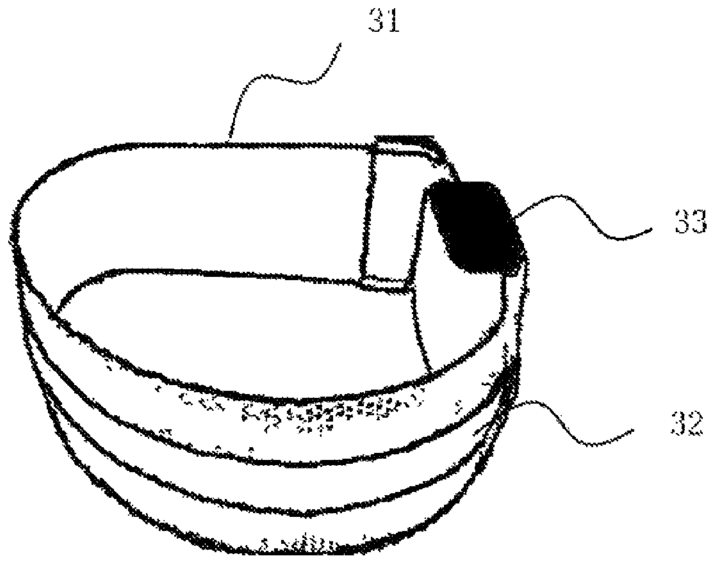
FIG. 2 is a diagram of a step information transmission unit.

FIG. 2 is a diagram illustrating one step information transmission unit 30 according to the present embodiment. The step information transmission units 30 are unit devices mounted on the respective legs of the player, and are individually mounted on both legs. Therefore, two step information transmission units 30 are necessary for one player.

As illustrated in FIG. 2, a size of each of the step information transmission units 30 is adjustable by a belt 31 so as to be mounted on legs with different sizes. An element transmitting the step detection signal, for example, a signal transmission element 32 such as an LED is mounted on an outer peripheral portion of each of the step information transmission units 30. A battery, an electronic circuit, and a sensor, for example, an acceleration sensor and an IC are incorporated in a module 33 incorporated in the belt. When the foot of the player contacts the ground surface, and acceleration, vibration, or impact corresponding to the step is detected, the signal transmission element 32 transmits the step detection signal, for example, light.

The signal transmission element 32 is, for example, an LED, an infrared light emitting diode, or a device transmitting visible and invisible signals such as ultrasonic waves and radio waves.

In each of the step information transmission units 30, the sensor detecting the step is a sensor device that can measure a step when the foot contacts the ground surface, for example, an acceleration sensor, a vibration sensor, or an impact sensor.

<Step Information Reception Unit>

Figure 3:
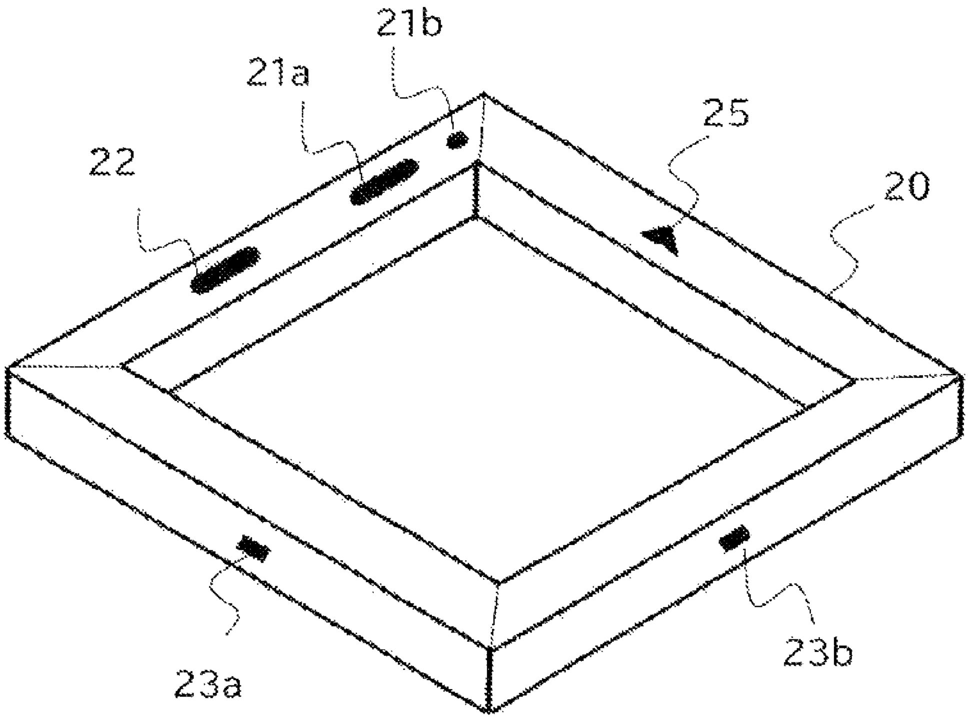
FIG. 3 illustrates an arrangement example of a step information reception unit.
Figure 4:
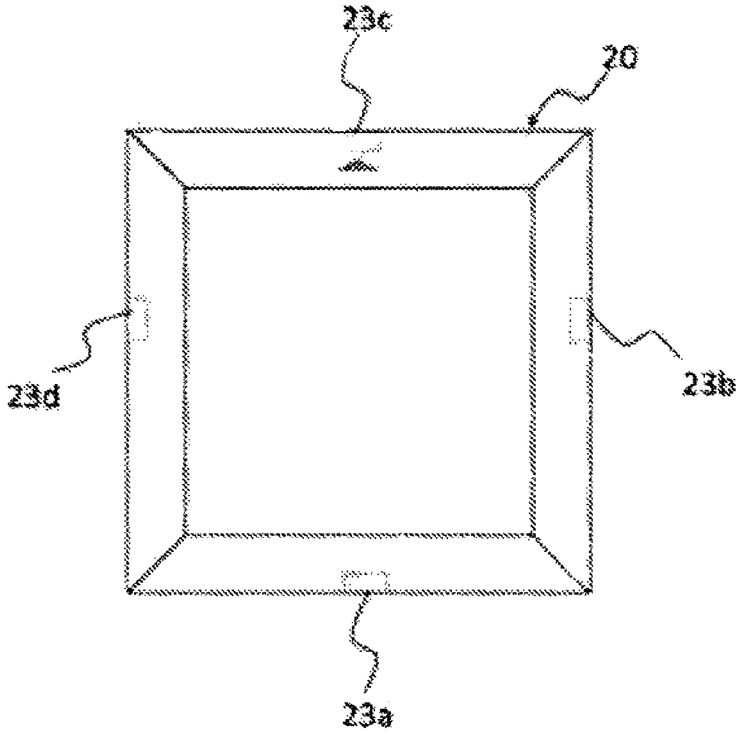
FIG. 4 is a diagram illustrating the step information reception unit as viewed from a front side.

FIG. 3 illustrates an arrangement example of the step information reception unit 20 according to the present embodiment. FIG. 4 is a plan view of the step information reception unit 20 according to the present embodiment. As illustrated in FIGS. 3 and 4, a main body (housing) of the step information reception unit 20 according to the present embodiment has a rectangular frame structure, and includes a power switch 21*a*, an operation switch 22, sensors 23, and a direction indicator 25.

The power switch 21*a* is a switch for switching power ON/OFF. A reference numeral 21*b* denotes an LED lamp indicating a state of power ON/OFF. The LED lamp 21*b* is turned on when the power is ON, and is turned off when the power is OFF. The step information reception unit 20 operates by driving power supplied from a dry-cell battery, a rechargeable battery, or the like. The operation switch 22 is an operation switch for mode change and various kinds of settings.

The direction indicator 25 is an indicator indicating, for example, a front direction (F). The player arranges the step information reception unit 20 on the ground surface such that the direction indicator 25 is directed to a front side.

The sensors 23 are sensor devices detecting an object and the signals from the step information transmission units 30 in the sensing regions. Examples of the sensors 23 include an infrared ray sensor, a phototransistor, an ultrasonic sensor, an optical sensor, a motion sensor, a laser, and a CCD sensor.

Note that, in FIG. 4, one or more sensors 23 are provided on each of the sides of the outer peripheral portion (outer edges) of the step information reception unit 20. As the step information reception unit 20, at least four sensors 23*a*, 23*b*, 23*c*, and 23*d* are provided in total. In the signal detection mode, in a case where any of the sensors 23 detects the step detection signal, for example, light transmitted from the step information transmission unit 30, a step is detected. In the object detection mode, in a case where any of the sensors 23 detects that the foot enters the corresponding sensing region of the step information reception unit 20, a step is detected. The plurality of sensors 23 may be provided on each of sides of the outer peripheral portion depending on a type and detection accuracy of the sensors, as a matter of course.

<Functional Configuration>

Figure 5:
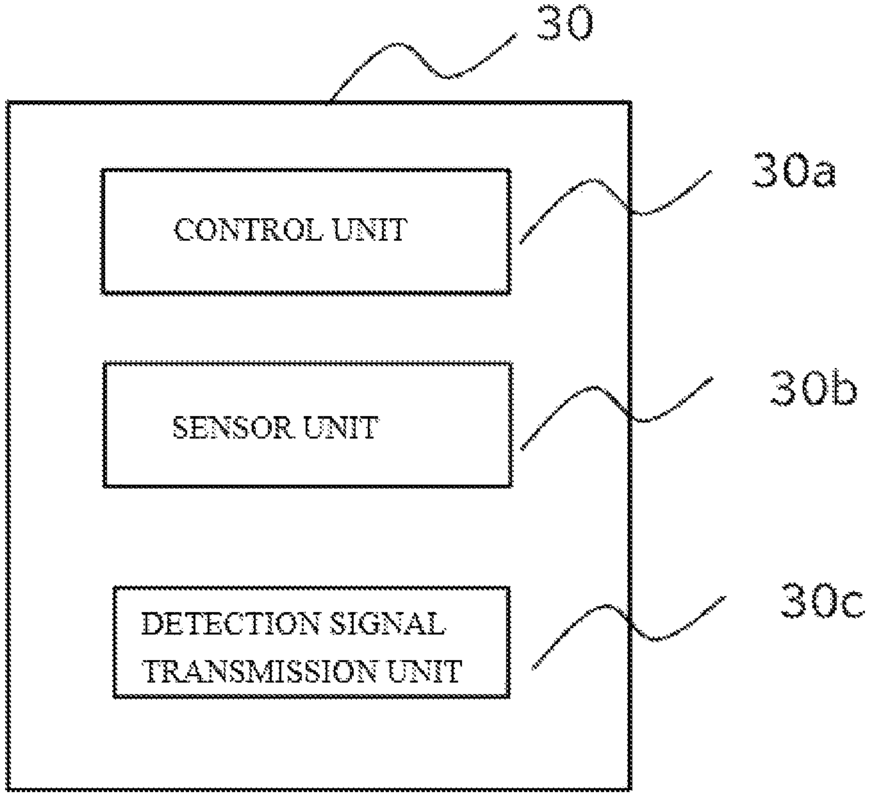
FIG. 5 is a diagram illustrating a functional configuration example of the step information transmission unit.

FIG. 5 is a diagram illustrating a functional configuration example of each of the step information transmission units 30 according to the present embodiment. As illustrated in FIG. 5, each of the step information transmission units 30 according to the present embodiment includes, as main functional units, a control unit 30*a*, a sensor unit 30*b*, and a detection signal transmission unit 30*c*.

The control unit 30*a* controls operation of the whole of the own step information transmission unit 30 including the sensor unit 30*b* and the detection signal transmission unit 30*c*. The sensor unit 30*b* measures acceleration, vibration, or impact generated when the player steps and the corresponding foot contacts the ground surface. When determining that a result of the measurement is acceleration or vibration corresponding to a step, the control unit 30 causes the detection signal transmission unit 30*c* to transmit the step detection signal, for example, light.

Figure 6:
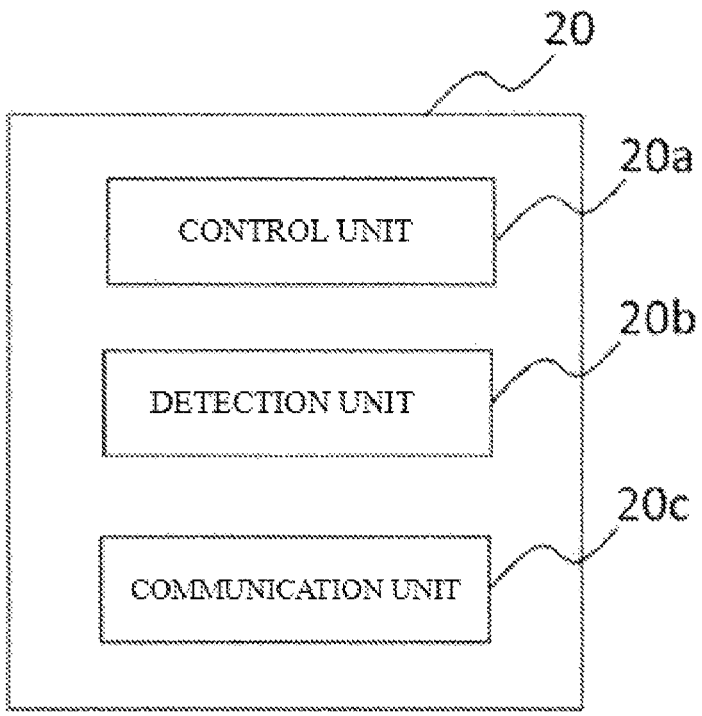
FIG. 6 is a diagram illustrating a functional configuration example of the step information reception unit.

FIG. 6 is a diagram illustrating a functional configuration example of the step information reception unit 20 according to the present embodiment. As illustrated in FIG. 6, the step information reception unit 20 according to the present embodiment includes, as main functional units, a control unit 20*a*, a detection unit 20*b*, and a communication unit 20*c*.

The control unit 20 controls operation of the whole of the step information reception unit 20 including the detection unit 20*b* and the communication unit 20*c*. In the signal detection mode, the detection unit 20*b* detects the step detection signal, for example, light transmitted from the step information transmission unit 30 mounted on the legs of the player. When the detection unit 20*b* detects the step detection signal, for example, light transmitted from the step information transmission unit 30 mounted on the legs of the player, the communication unit 20*c* transmits the step detection information including the detection result of the step detection signal and the position of the step detection area, to the game device 10 through the network 40. In the object detection mode, the detection unit 20*b* detects a step when the foot enters any of the sensing regions of the sensors 23, and the communication unit 20*c* transmits the step detection information including the detection result and the position of the step detection area, to the game device 10 through the network.

The above-described functional units configure the step information reception unit 20 and the step information transmission units 30. The above-described functional units are realized by control programs executed on hardware resources of a computer, such as a CPU, a ROM, and a RAM. Further, each of these functional units may be read as "means", "module", "unit", or "circuit".

<Sensing Region>

Figure 8:
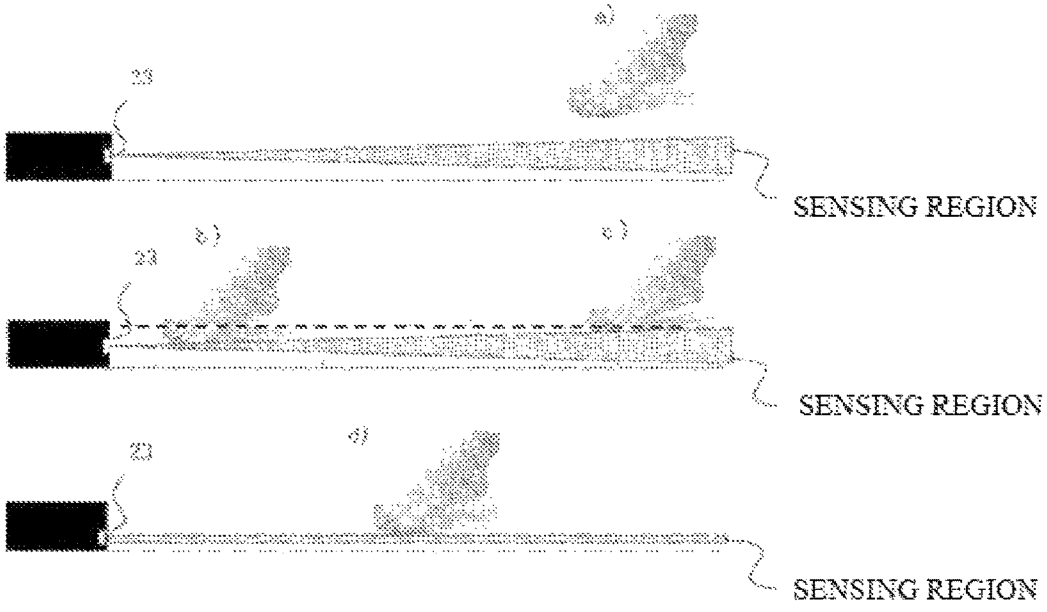
FIG. 8 is a diagram illustrating issues in Patent Literature 2 and Patent Literature 3, and the sensing region on a vertical plane.

FIG. 7 is a diagram illustrating, by hatching, the sensing regions of the respective sensors on a horizontal plane when the step information reception unit 20 according to the present embodiment is viewed from above. FIG. 8 is a diagram illustrating, by hatching, the sensing region of the sensor on a vertical plane. In the signal detection mode, the sensing regions are regions where the step detection signal, for example, light is detected when the player steps in the sensing regions. In the object detection mode, the sensing regions are regions where a step is detected when the foot enters the sensing regions. The sensing regions generally tend to diffuse, and each of the sensors may have the sensing region at a wide reaction angle (for example, 60 degrees) illustrated in FIG. 7-*a* or the sensing region at a narrow reaction angle (for example, 20 degrees) illustrated in FIG. 7-*b*, from the side of the outer peripheral portion where each of the sensors is provided, to an outside. These sensing regions can be adjusted depending on a type of the sensors, a mechanism around the sensors, and mounted parts.

Specific description is given with reference to FIG. 7-*a*. The sensor 23*a* has the sensing region in an area B (Back), the sensor 23*b* has the sensing region in an area R (Right), the sensor 23*c* has the sensing region in an area F (Front), and the sensor 23*d* has the sensing region in an area L (Left). Therefore, in the signal detection mode, in a case where the player steps by landing on the area B and the sensor 23*a* detects the step detection signal, for example, light transmitted from the step information transmission unit 30, the step is detected. In a case where the player steps by landing on the area R and the sensor 23*b* detects the step detection signal, for example, light transmitted from the step information transmission unit 30, the step is detected. In a case where the player steps by landing on the area F and the sensor 23*c* detects the step detection signal, for example, light transmitted from the step information transmission unit 30, the step is detected. In a case where the player steps by landing on the area L and the sensor 23*d* detects the step detection signal, for example, light transmitted from the step information transmission unit 30, the step is detected. In the object detection mode, when the foot enters any of the sensing regions of the areas, the step is detected.

In consideration of a general stride length of a person, each of the sides of the step information reception unit 20 desirably has a length of, for example, 27 cm or more and 30 cm or less. A center portion (cavity portion) of the step information reception unit 20 is saved in space, and a space sufficient for the player to stand up is not secured. Therefore, before start of the game, it is necessary for the player to stand up in any of the sensing regions of the step information reception unit 20. Even when the player stands up in any of the sensing regions, cooperation with game software allows a step not to be detected before start of the game.

Issues as the step detection unit in Patent Literature 2 and Patent Literature 3 are described. In the inventions disclosed in Patent Literatures described above, sensors are installed on an outer peripheral portion of a polygonal housing, and a step is detected when a foot of the player is detected in any of sensing regions of the sensors. The sensing regions of the sensors generally tend to diffuse. A degree of the diffusion is increased as distances from the sensors is increased. Therefore, by the detection method disclosed in Patent Literatures described above, even when the foot of the player does not contact a floor surface or a ground surface, the sensors tend to detect a step, even though sensitivity of the sensors is adjusted. Thus, the sensors detect a step even though the foot does not contact the floor surface or the ground surface, which makes it difficult to enhance step detection accuracy.

FIG. 8 is a diagram illustrating the sensing region in the vertical direction as viewed from a side, to explain the issues of the step detection accuracy in Patent Literature 2 and Patent Literature 3 described above. In the drawing, the sensing region is illustrated by hatching. a) illustrates a case where a foot is positioned above the diffusing sensing region. No step is detected at this position. b) and c) each illustrate a region where the foot contacts the sensing region and detection of a step is started. However, since the sensing region diffuses, a height at which the step is detected is different between a case b) where the player steps at a position close to the sensor and a case c) where the player steps at a position separated from the sensor. In the case c), the step is detected at a position higher than the ground surface. To eliminate such diffusion of the sensing region, it is necessary to perform detection by using the sensor having the sensing region d) with less diffusion, such as a laser beam. However, detection by the laser beam requires a configuration using an expensive electronic member, and is not suitable for a game device of an inexpensive consumer product. In addition to these issues, as described above, there is an issue that a step is detected at a position where the foot of the player does not contact the ground surface in the diffusing sensing region, which makes it difficult to perform step detection with high accuracy. In a case where accuracy of step detection cannot be enhanced in a game requiring a step at a correct timing, quality of game experience for the user is reduced. Patent Literature 2 and Patent Literature 3 described above are filed in 2008; however, there is no evidence of commercialization of the disclosed technique, and it is considered that commercialization has been abandoned because the issue in step detection accuracy caused by diffusion of the sensor region is not solved.

<Game Screen>

Figure 9:
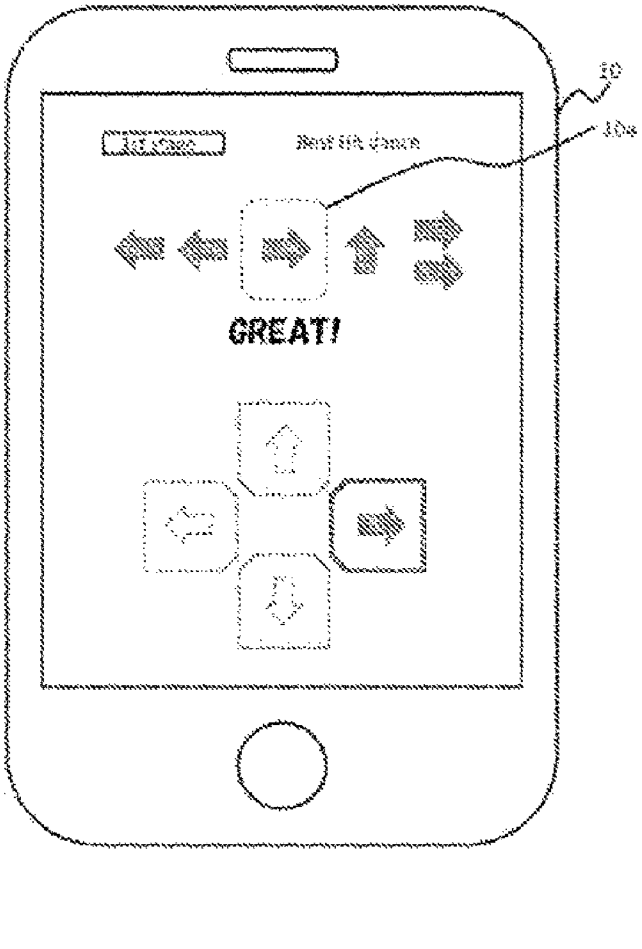
FIG. 9 is a diagram illustrating an example of a game screen when the step information reception unit has four detection directions.

FIG. 9 is a diagram illustrating an example of a game screen according to the present embodiment.

When the game starts, namely, performance of a music piece starts, the arrow object indicating any of upper, lower, right, and left directions or simultaneously indicating a plurality of directions flows on the game screen. Thus, the player steps in the indicated direction at a timing when the arrow object overlaps with a step zone (determination position) 10*a*. In a case of the game screen illustrated in FIG. 9, the arrow object indicating the right direction is shown in the step zone 10*a*. The player firmly steps in the area R corresponding to the right direction at the timing when the arrow object overlaps with the step zone 10*a*.

An example is described with reference to FIG. 7-*a*. In the signal detection mode, when the player steps in the area R where the sensing region of the sensor 23*b* is present, and the sensor 23*b* detects the step detection signal, for example, light transmitted from the step information transmission unit 30 mounted on the stepping leg of the player, the step information reception unit 20 transmits the step detection information including the detection result of the step detection signal and a detection position of the step detection signal (for example, area R), to the game device 10 through the network 40. In the object detection mode, when the player steps in the area R where the sensing region of the sensor 23*b* is present, and the foot of the player enters the sensing region, a step is detected, and the step detection information including the detection result of the step and the detection position (for example, area R) is transmitted to the game device 10 through the network 40. When receiving the step detection information from the step information reception unit 20, the game device 10 compares the direction (for example, area R) indicated by the arrow object in the step zone 10*a* on the game screen, with the step detection signal and the step position information (for example, area R) as the step detection information acquired from the step information reception unit 20. In a case where both are coincident with each other, it is determined that the step direction is correct. In contrast, in a case where both are not coincident with each other, it is determined that the step direction is incorrect.

In addition, in a case where the step direction is correct, it is determined whether the step has been detected at the timing when the arrow object overlaps with the step zone 10*a*. For example, in a case where the step has been detected within a predetermined time (for example, one second) when the arrow object overlaps with the step zone 10*a*, it is determined that the step timing is correct. In contrast, in a case where the step has not been detected within the predetermined time, it is determined that the step timing is incorrect. In a case where it is determined that the step direction and the step timing are correct, the game device 10 adds a point. A display indicating success (for example, "GREAT!") is displayed on the game screen.

As described above, the step information reception unit 20 operates by the driving power supplied from a dry-cell battery, a rechargeable battery, or the like. To suppress power consumption of the sensors 23 in terms of power saving, power control of the sensors 23 is important for prolonging a battery life. More specifically, the step information reception unit 20 (control unit 20*a*) performs control to turn on each of the sensors 23 in synchronization with the timing when the arrow object of the game overlaps with the step zone 10*a*, and to turn off each of the sensors 23 when detection of a step is unnecessary. This prolongs the battery life of the step information reception unit 20, which enables the player to play the game for a long time and improves attractiveness as the step detection unit.

Figure 10:
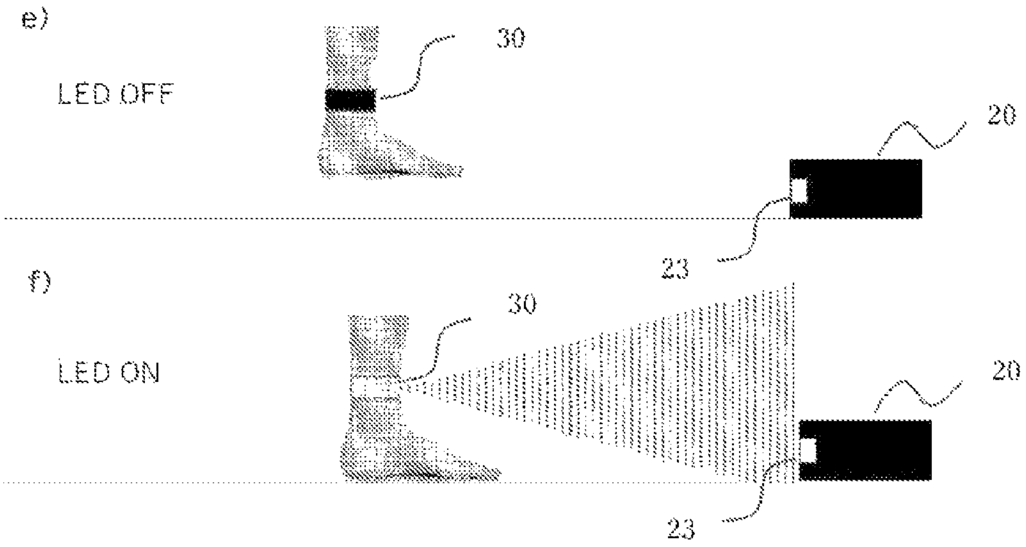
FIG. 10 is a diagram illustrating relationship in which a sensor detects a step detection signal, as viewed from a side.

FIG. 10 is a diagram illustrating, in the signal detection mode, the step detection signal transmitted from the step information transmission unit 30, and a state where the step information reception unit 20 receives the step detection signal as viewed from a side, according to the present embodiment. In the drawing, the signal transmitted from the step information transmission unit 30 is described by using light of an LED as an example.

As illustrated in FIG. 10, in a case e) where the step (foot) of the player does not contact the ground surface, the LED of the step information transmission unit 30 is not turned on. In a case f) where the step information transmission unit 30 detects acceleration or vibration corresponding to the step from impact when the player steps and the foot lands on the floor surface or the ground surface, the LED of the step information transmission unit 30 is turned on and transmits a light signal. In a case where any of the sensor 23 detects the signal, it is detected that the player steps in the area corresponding to the sensing region of the sensor 23.

Note that a position of the step detection signal transmitted from the step information transmission unit 30 is higher than installation positions of the sensors 23. Therefore, the installation angles of the sensors 23 and the peripheral mechanism are preferably configured so as to detect the step signal transmitted when the player contacts the ground surface. This is to more surely detect the step detection signal of the step information transmission unit 30.

Modification 1

Figure 11:
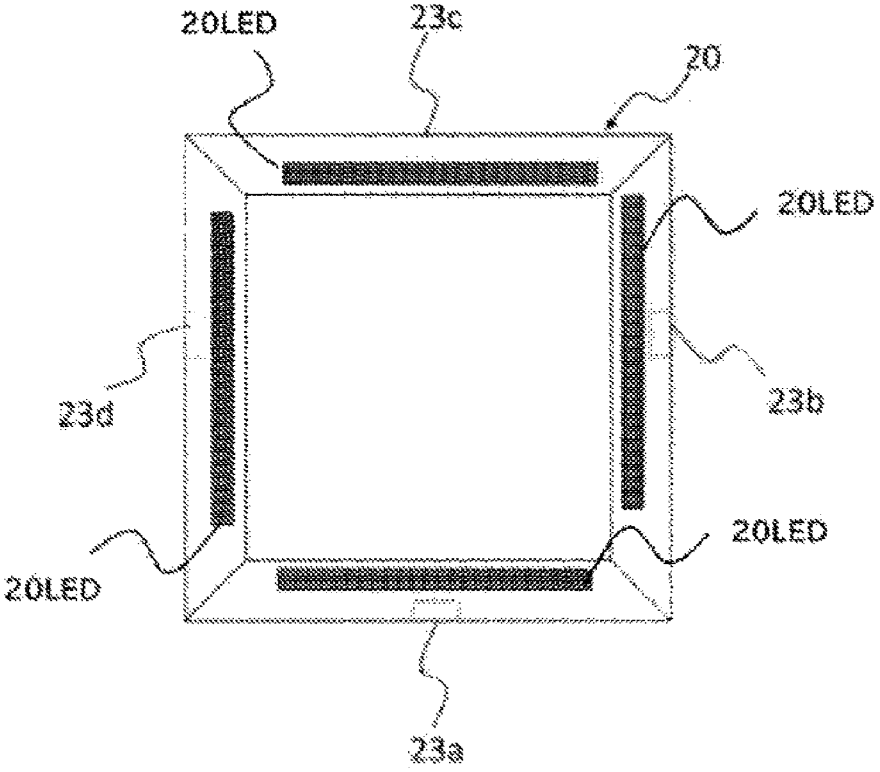
FIG. 11 illustrates an example in which LEDs are arranged on the step information reception unit.

FIG. 11 is a diagram in a case where color light-emitting elements 20LED are mounted on respective sides of the frame of the step information reception unit 20 in order to enhance realistic sensation in the game. For example, in a case where the user steps at the position corresponding to the direction of the arrow object at the timing when the arrow objects overlap with the step zone 10*a* on the game screen, the corresponding light-emitting element 20LED is turned on to enhance the realistic sensation in the game. It is necessary for each of the light-emitting elements 20LED to have a structure not causing an error in sensitivity of the step detection by each of the sensors. In addition to lighting effects by the color LEDs, sound effects are prepared for the step at the above-described timing, which makes it possible to further enhance the realistic sensation.

Modification 2

Figure 12:
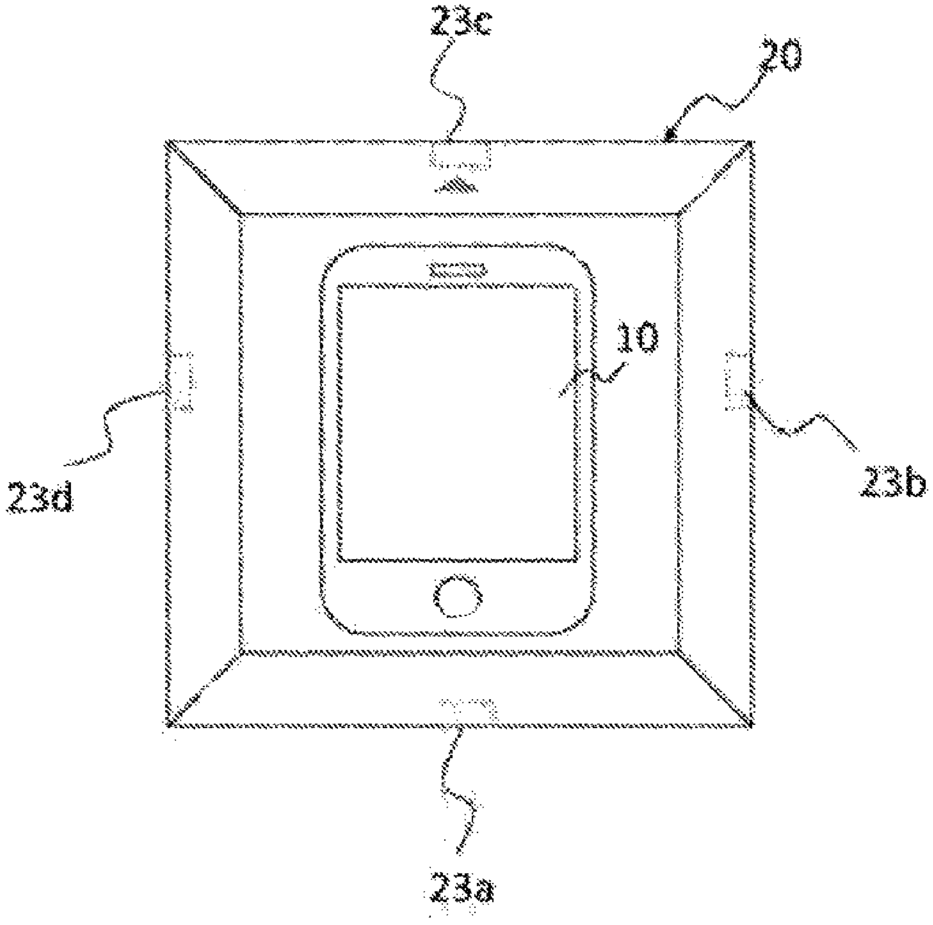
FIG. 12 illustrates an example in which a game device is placed in a cavity portion of the step information reception unit.

FIG. 12 is a plan view illustrating a configuration example in which the game system according to the embodiment described with reference to FIG. 1 is modified. The game system 100 in FIG. 12 includes the game device 10, the step information reception unit 20, and the step information transmission units 30 that are connected to the game device 10 through the network 40. In comparison with FIG. 1, the game device 10 is disposed in the space at the center portion (cavity portion) of the step information reception unit 20.

According to the present modification, the player plays the game while facing the step information reception unit 20 disposed on the ground surface, namely, looking down. As a result, the player can practice steps while surely checking the own steps. This makes it possible to reduce risk of overturning and anxiety in, for example, an inexperienced beginner, and an effect such as further improvement in steps can be expected.

A mechanism for attaching the game device 10 such as a smart phone to the step information reception unit 20 can be provided in order to arrange or fix the game device 10 in the space at the center portion of the step information reception unit 20.

Modification 3

Figure 13:
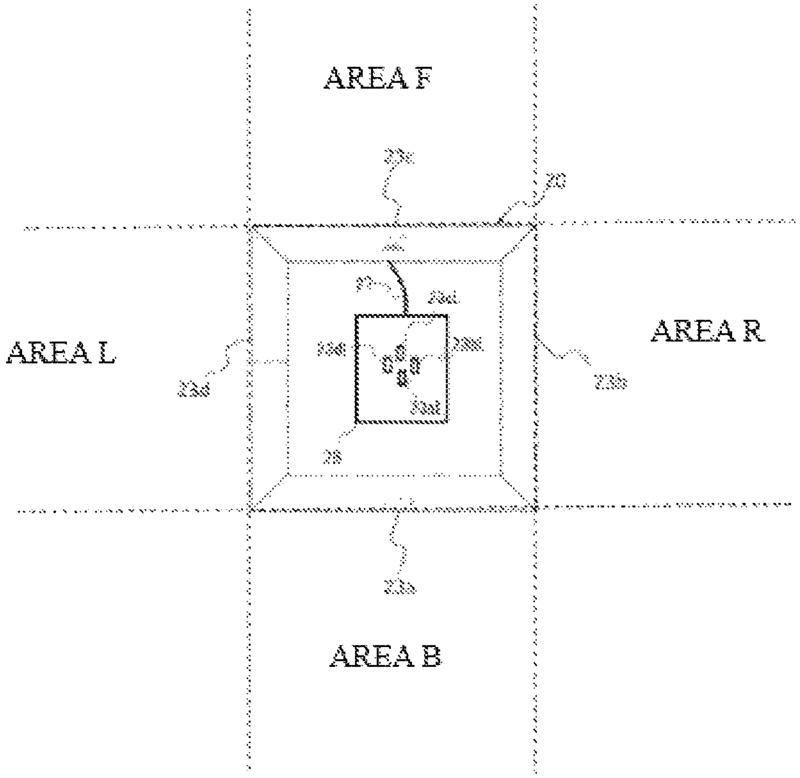
FIG. 13 illustrates an example in which a detection information notification unit is installed in the step information reception unit.

FIG. 13 is a diagram in a case where a detection information notification unit 28 is disposed in the space at the center portion of the step information reception unit 20. The detection information notification unit 28 is a terminal for notifying the step detection information including the detection result of the step detection signal and the step detection area, of the sensors on the outer peripheral portion of the step information reception unit 20. The detection information notification unit 28 is electrically joined with the step information reception unit 20 by a cable 27. In a case where the step detection signal is detected in any of the sensing regions of the step information reception unit 20, the detection information notification unit 28 notifies the step detection information including the detection result and the detection position, by visible information such as lighting of the light-emitting element and digital display, or by invisible information such as radio waves.

A notification method by the detection information notification unit 28 illustrated in FIG. 13 is specifically described by using a case where notification is performed by lighting of the light-emitting element as an example. When the player steps in the area L that has the sensing region extending on the outer peripheral portion of the sensor 23*d* of the step information reception unit 20, and the step is detected, a light-emitting element 23*d*L is turned on. When the the player steps in the area B that has the sensing region extending on the outer peripheral portion of the sensor 23*a* of the step information reception unit 20, and the step is detected, a light-emitting element 23*a*L is turned on. When the player steps in the area R that has the sensing region extending on the outer peripheral portion of the sensor 23*b* of the step information reception unit 20, and the step is detected, a light-emitting element 23*b*L is turned on. When the player steps in the area F that has the sensing region extending on the outer peripheral portion of the sensor 23*c* of the step information reception unit 20, and the step is detected, a light-emitting element 23*c*L is turned on.

The notification by lighting of the light-emitting element can be changed to digital display. For example, the notification by the light-emitting element 23*d*L can be changed to display L (Left), the notification by the light-emitting element 23*a*L can be changed to display B (back), the notification by the light-emitting element 23*b*L can be changed to display R (right), and the notification by the light-emitting element 23*c*L can be changed to display F (Front). In addition, any visible information such as a QR Code® can be used.

The visible information notified from the detection information notification unit 28 can be monitored by a camera of a smart device installed with a specially-developed image recognition application or software, such as a smart phone, a tablet, and a game terminal, and the step detection information acquired from the detection information notification unit 28 can be transmitted to the game device 10 through the network 40 by using a communication function of the smart device. In a case where the notification from the detection information notification unit 28 is transmitted by invisible information, the step detection information is transmitted to the smart device by, for example, NFC or other wireless means. The invisible information can be monitored by the application or software installed in the smart device, and the step detection information acquired from the detection information notification unit 28 can be transmitted to the game device 10 through the network 40 by using the communication function of the smart device. By using the detection information notification unit 28, it is unnecessary to incorporate a communication module for transmitting information to the network 40, in the step information reception unit 20, which makes it possible to reduce a part cost and to reduce a price of a product. In addition, when the detection of the notification signal of the detection information notification unit 28 is monitored by a rear camera of the smart device, and a display unit of the smart device displays the game screen while being directed upward, the game device 10 can be placed at the center portion of the step information reception unit 20, and the player can play the game while viewing the game screen at the center portion of the step information reception unit 20.

Modification 4

Figure 14:
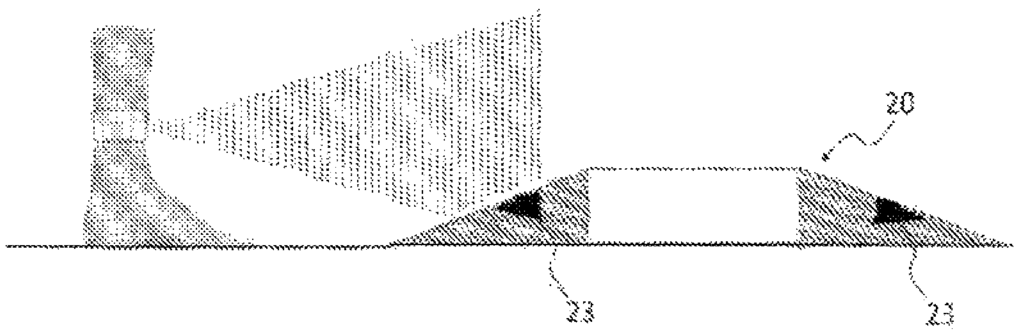
FIG. 14 is a diagram illustrating the step information reception unit including inclination.

FIG. 14 is a cross-sectional view of the step information reception unit 20 according to the present modification. The step information reception unit 20 illustrated in FIG. 14 has a configuration in which a corner of each side is inclined, in comparison with the above-described embodiment (for example, FIG. 3 and FIG. 7). When the player steps, if the foot erroneously contacts the corner of the main body of the step information reception unit 20, the user may sprain an ankle. To avoid such circumstances, each corner is made inclined. This makes it possible to reduce a risk of injury during the game. Further, each of the sensors 23 can easily receive the signal transmitted from a position higher than the position on the horizontal plane. In the signal detection mode, an effect of enhancement in detection accuracy of the sensors can be expected.

Modification 5

Figure 15:
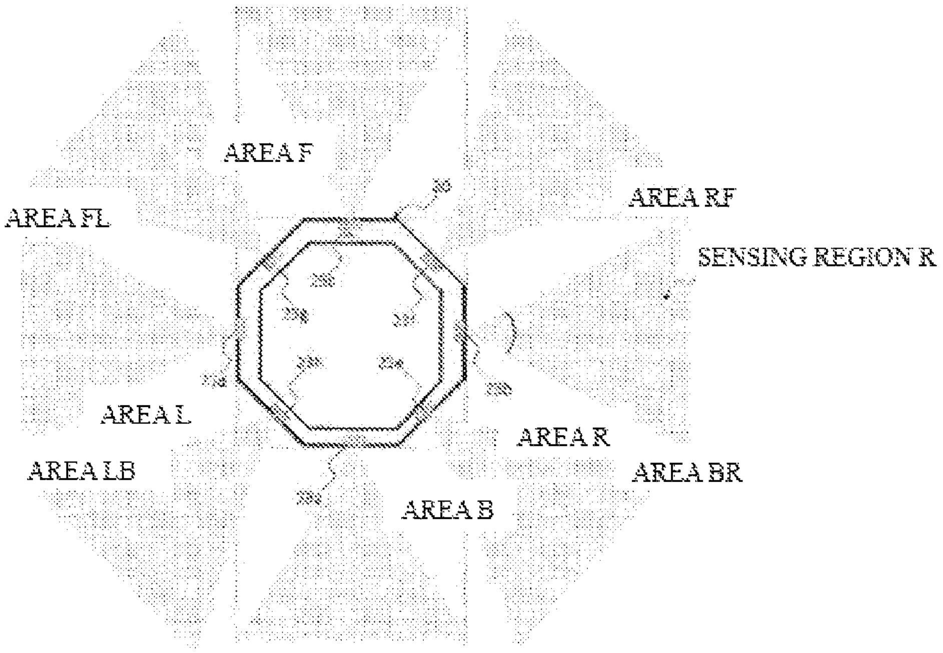
FIG. 15 illustrates an example in which the step information reception unit has an octagonal shape.

FIG. 15 is a diagram illustrating the sensing regions of the step information reception unit 20 according to the present modification as viewed from a plane direction. In comparison with FIG. 7, the step information reception unit 20 according to the present modification has an octagonal frame structure. One or more sensors 23 are provided on each of eight sides of the outer peripheral portion (outer edges) of the step information reception unit 20. As the step information reception unit 20, at least eight sensors 23*a*, 23*b*, 23*c*, 23*d*, 23*e*, 23*f*, 23*g*, and 23*h* are provided in total.

As illustrated by hatching regions in FIG. 15, each of the sensors 23 has the sensing region for detecting the signal transmitted from the step information transmission unit 30 or the foot at a predetermined reaction angle (for example, 60 degrees), from the side of the outer peripheral portion where the sensor 23 is provided, to an outside. More specifically, the sensor 23*e* has the sensing region in an area BR, the sensor 23*f* has the sensing region in an area RF, the sensor 23*g* has the sensing region in an area FL, and the sensor 23*h* has the sensing region in an area LB. Therefore, in the signal detection mode, in a case where the player lands on the area BR and steps, the sensor 23*e* detects the step detection signal, for example, light from the step information transmission unit 30. In a case where the player lands on the area RF and steps, the sensor 23*f* detects the step detection signal, for example, light from the step information transmission unit 30. In a case where the player lands on the area FL and steps, the sensor 23*g* detects the step detection signal, for example, light from the step information transmission unit 30. In a case where the player lands on the area LB and steps, the sensor 23*h* detects the step detection signal, for example, light from the step information transmission unit 30. In the object detection mode, when the foot enters any of the sensing regions in the areas, a step is detected. In the signal detection mode and the object detection mode, the step detection signal including the detection result of the step detection signal and the step detection positional information (for example, area RF) is transmitted to the game device 10 through the network 40.

Figure 16:
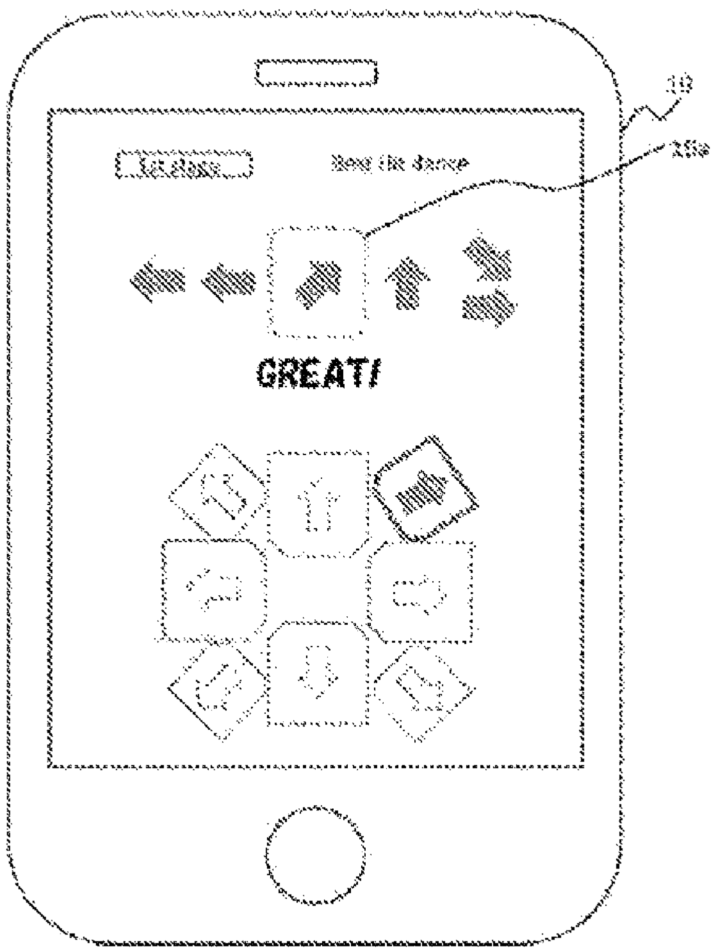
FIG. 16 is a diagram illustrating an example of a game screen when the step information reception unit has eight detection directions.

FIG. 16 is a diagram illustrating an example of a game screen of a game in which the user steps in eight directions according to the present modification.

When the game starts and performance of a music piece starts, the arrow object indicating any of upper, lower, right, and left directions and oblique directions (lower right, upper right, upper left, and lower left) or simultaneously indicating a plurality of directions flows on the game screen. Thus, the player steps in the designated direction at the timing when the arrow object overlaps with the step zone (determination position) 10*a*. In a case of the game screen illustrated in FIG. 16, the arrow object indicating the upper right direction is shown in the step zone 10*a*. The player firmly steps in the area RF corresponding to the upper right direction at the timing when the arrow object overlaps with the step zone 10*a*.

As described in the present modification, the step information reception unit 20 is not limited to the rectangular shape, and may have, for example, a polygonal frame structure. Further, in addition to the rectangular shape (square shape) and the octagonal shape, the step information reception unit 20 may have, for example, a triangular shape or a hexagonal shape. The player steps in the sensing regions corresponding to the respective sides of the polygonal frame. As a result, the arrow object indicating not only the upper, lower, right, and left directions but also the oblique directions can be used in the game. This makes it possible to realize the game allowing various steps.

Modification 6

Figure 17:
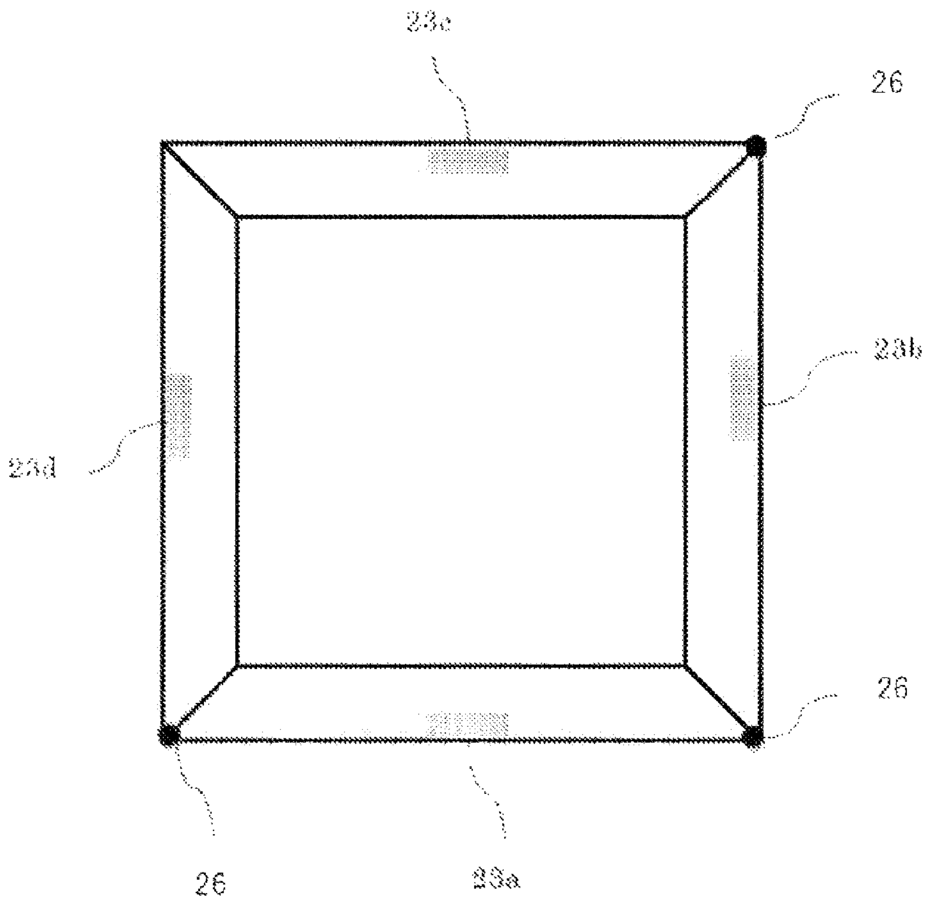
FIG. 17 is a diagram illustrating the step information reception unit including parts at corners.

FIG. 17 illustrates a structure in which the sides of the step information reception unit 20 are independently formed, and coupling portions of the sides are coupled by parts or contacts, for example, hinges 26. The structure enables the shape of the step information reception unit 20 to be changed from the square shape as illustrated in FIG. 3 to an optional shape such as a linear shape and an L-shape. As a result, the shape of the step information reception unit 20 can be deformed not only to the linear shape but also to various shapes, with the parts or the contacts, for example, the hinges 26 at the coupling portions of the sides as starting points.

Figure 18:
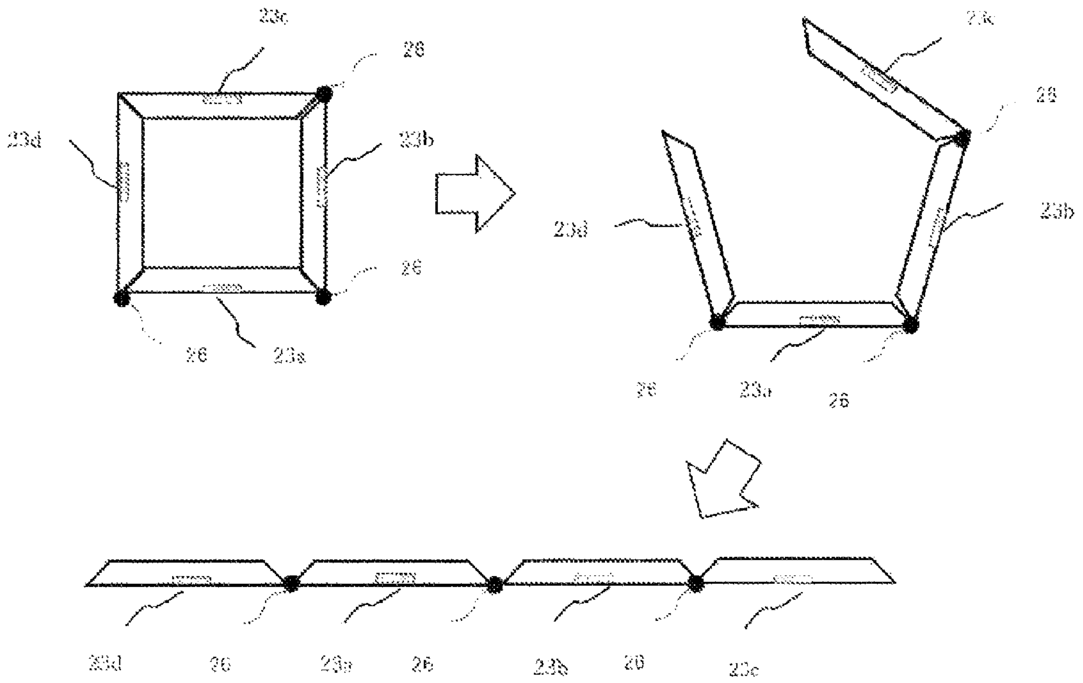
FIG. 18 illustrates an example to explain shape change by the parts.

FIG. 18 is a diagram illustrating a state where the step information reception unit 20 having the shape illustrated in FIG. 17 is deformed to the linear shape with the hingers 26 as the starting points, as viewed from a plane direction. In comparison with FIG. 3, FIG. 7, and FIG. 15, the step information reception unit 20 has a linear frame structure in FIG. 18.

Figure 19:
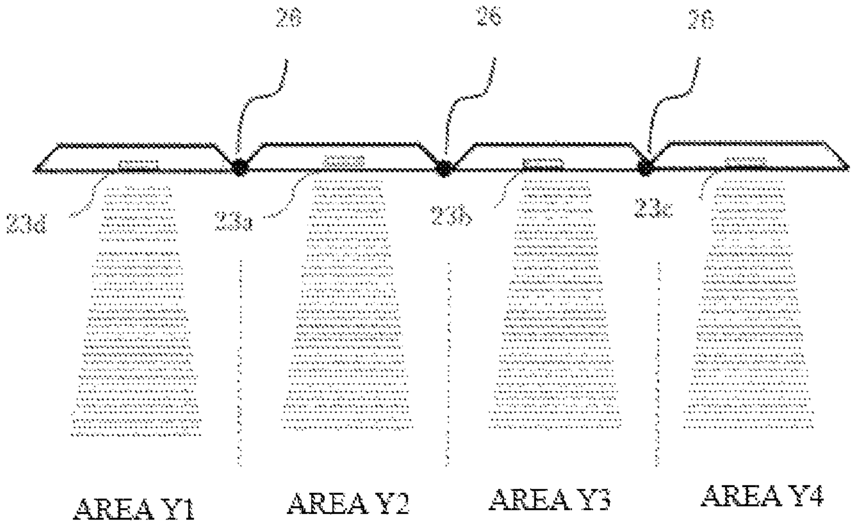
FIG. 19 illustrates an example when the step information reception unit is developed in one line in a horizontal direction.

FIG. 19 illustrates the sensing regions when the step information reception unit 20 is deformed to the linear shape. It is necessary to consider the sensing regions illustrated by hatching such that each of the sensing regions does not interfere with detection of an adjacent area. In the signal detection mode, in a case where the player steps in an area Y1, the sensor 23*d* detects the step detection signal, for example, light from the step information transmission unit 30. In a case where the player steps in an area Y2, the sensor 23*a* detects the step. In a case where the player steps in an area Y3, the sensor 23*b* detects the step. In a case where the player steps in an area Y4, the sensor 23*c* detects the step. The number of provided sensors and the number of provided sides can be adjusted based on the contents of the game. This makes it possible to perform deformation and detection in the horizontal direction and the vertical direction and in various shapes possible by the structure. For example, the shape of the step information reception unit 20 can be changed to an L-shape. The changeable shape advantageously increases the types of playable game. In addition, convenience in which the step information reception unit 20 can be folded and stored in a drawer of a desk and is portable is generated.

Figure 20:
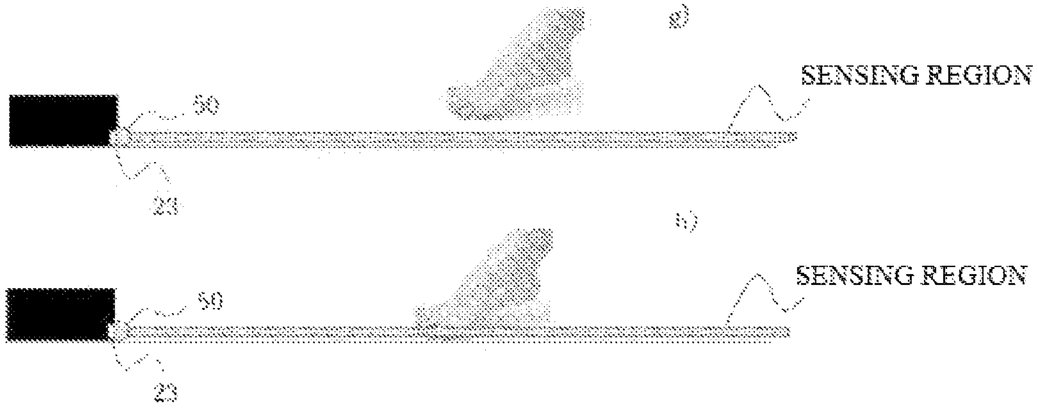
FIG. 20 is a diagram illustrating a sensing region when a lens is mounted on the sensor, as viewed from a side.

A method to solve the issue that the sensing region diffuses due to general characteristics of the sensor and a step cannot be detected with high accuracy is described. FIG. 20 is a diagram illustrating a state where a lens 50 is mounted on one sensor 23 as viewed from a side. When the lens 50 is mounted, diffusion of the sensing region can be converged in the vertical direction, and the sensing region close to a linear shape as viewed from a side can be formed. In the drawing, g) illustrates a state where a foot is present above the sensing region and no step is detected, and h) illustrates a state where the foot enters the sensing region and a step is detected. As the existing technique for obtaining the sensing region having less diffusion property, there is a method of performing detection by using a laser beam that requires an expensive electronic member not suitable for a consumer product. When the lens 50, for example, an inexpensive plastic lens is mounted on an inexpensive sensor 23, the sensing region low in diffusion property is formed in an area where the player steps during the game, namely, in an area within about 30 cm from the sensor 23. As a result, step detection with high accuracy can be performed at low cost, and the step can be detected by the single step information reception unit 20 without requiring the step information transmission units 30. Note that the step is detected when the foot enters the sensing region. Therefore, the sensor 23 is desirably installed at a position close to the ground surface. As a result, the timing when the foot contacts the ground surface and the timing when the foot enters the sensing region are substantially coincident with each other, which makes it possible to perform accurate step detection.

As described above, by improvement in step detection accuracy caused by mounting the lens on the sensor 23 and the structure in which the shape of the step information reception unit 20 can be changed according to the present embodiment, the step game in various forms can be supported. In terms of improvement in step detection accuracy, storability, and portability enabling the step information reception unit 20 to be folded and enhancement of storability, the present invention solves the issues not solved by the techniques disclosed in Patent Literature 2 and Patent Literature 3 described above. The present invention enables step detection improved in step detection accuracy while reducing the price and enhancing portability. Since the game system enables the player to step at any place such as a home and a visiting place, it is possible to provide a product that creates an opportunity for light exercise with enjoyment and contributes to improvement in physical health and mental health derived from the light exercise. A social advantage that the dance game promotes health can be expected.

Although the present invention is described above by showing the specific examples according to the preferred embodiment of the present invention, it is to be understood that the specific examples can be variously modified and changed without departing from the broader spirit and scope of the present invention as defined by the claims. In other words, the present invention should not be construed as being limited by the details of the specific examples and the accompanying drawings.

In FIG. 7-*a*, depending on the reaction angle (for example, 60 degrees) of each of the sensors 23 in the horizontal direction, the area (for example, area R) is not always completely coincident with the corresponding sensing region (for example, sensing region R) in the horizontal direction. In other words, in a case where the player steps in a non-detection region out of the sensing region (for example, sensing region R) in the horizontal direction even within the corresponding area (for example, area R), the step is not detected. However, as described above, each of the sides of the step information reception unit 20 has a size of, for example, 27 cm or more and 30 cm or less in consideration of portability. Therefore, the non-detection region is extremely small, and does not influence on actual play of the game.

Note that, when the reaction angle of each of the sensors 23 is set large, the non-detection region is reduced, whereas when the reaction angle of each of the sensors 23 is set small, the non-detection region is increased. In the case where the step information reception unit is arranged in a linear shape, if the reaction angle of each of the sensors 23 is set excessively large, the sensing region expands to the other area, and erroneous detection that the step is detected in two areas occurs. Therefore, the reaction angle of each of the sensors 23 is desirably set such that the sensing region does not expand to the other area and the non-detection region becomes minimum.

In the above description, the main body of the step information reception unit 20 has the rectangular frame structure. However, the shape of the main body of the step information reception unit 20 is not limited to the frame structure, and may be, for example, a circular or polygonal board structure. In this case, no cavity portion is provided at the center portion of the step information reception unit 20, but the sensors 23 are still provided on the respective sides. The game device 10 can be disposed near the center portion on the board of the step detection reception unit 20. In addition, a mechanism for attaching the game device 10 to the main body of the step information reception unit 20 can be provided near the center portion on the board.

Production and commercialization are performed while one of the signal detection mode and the object detection mode is selected based on the contents of the game and the like. As necessary, both modes may be provided in one device.

REFERENCE SIGNS LIST

10 Game device
10*a* State where arrow object overlaps with step zone (determination position)
20 Step information reception unit
20*a* Control unit
20*b* Detection unit
20*c* Communication unit
20LED LED
21*a* Power switch
21*b* LED lamp indicating state of power ON/OFF
22 Operation switch
22(*a* to *h*) Sensor of step information reception unit
23*a*L Light-emitting element turned on when sensor 23*a* detects step
23*b*L Light-emitting element turned on when sensor 23*b* detects step
23*c*L Light-emitting element turned on when sensor 23*c* detects step
23*d*L Light-emitting element turned on when sensor 23*d* detects step
25 Direction indicator
26 Hinge
27 Cable
28 Detection information notification unit
30 Step information transmission unit
30*a* Control unit
30*b* Sensor unit
30*c* Detection signal transmission unit
31 Belt of step information transmission unit
32 Signal transmission element of step information transmission unit
33 Module of step information transmission unit
40 Network
50 Lens
100 Game system
Area F Front area
Area L Left area
Area R Right area
Area B Back area
Area RF Oblique upper right area
Area FL Oblique upper left area
Area BR Oblique lower right area
Area LB Oblique lower left area
Area Y1 First area from left
Area Y2 Second area from left
Area Y3 Third area from left
Area Y4 Fourth area from left
Sensing region Sensing region of sensor 23
Sensing region R Sensing region of sensor 23 in right area
a) State where foot is positioned above diffusing sensing region
b) State where foot contacts diffusing sensing region at position close to sensor
c) State where foot contacts diffusing sensing region at position far from sensor
d) State where foot contacts non-diffusing sensing region arranged at lowermost position
e) State where step information transmission unit does not transmit step detection signal
f) State where step information transmission unit transmits step detection signal
g) State where step is not detected
h) State where step is detected

The invention claimed is:

1. A step detection unit, comprising: step information transmission units individually mounted on respective legs of a player, each configured to measure, by a built-in sensor, acceleration, vibration, or impact generated when the player steps and a foot contacts a floor surface or a ground surface, and configured to transmit a step detection signal, the step detection signal is light in a case where a result of the measurement is a level corresponding to a step; and a step information reception unit including sensing regions for detecting spaces extending within certain ranges from one or more sensors provided on sides of an outer peripheral portion of a polygonal housing disposed on the floor surface or the ground surface, wherein when the player steps in an area corresponding to any of the sensing regions, the step information transmission unit mounted on the stepping leg of the player transmits the step detection signal, when the step detection signal is detected in the sensing region on the outer peripheral portion of the step information reception unit, it is detected that the player steps, and the step detection unit includes a communication means configured to transmit step detection information including a detection result of the step detection signal and a position of a step detection area, to a game device through a network by using a communication function incorporated in the unit.

2. The step detection unit according to claim 1, further comprising a detection information notification unit as a terminal electrically connected to the step information reception unit by a cable, and configured to notify the step detection information including the detection result of the step detection signal by any of the sensors provided on the sides of the outer peripheral portion of the step information reception unit and the position of the detection area corresponding to the sensing region of the sensor, by visible information, or by invisible information, in a case of notification by the visible information, the visible information is monitored by a camera of a smart device, image recognition is performed by a dedicated application or software installed in the smart device, and the step detection information notified by the detection information notification unit is transmitted to the game device though the network by using a communication function held by the smart device, and in a case of notification by the invisible information, the step detection information is transmitted to the smart device by the invisible information, recognition is performed by the dedicated application or software installed in the smart device, and the step detection information notified by the detection information notification unit is transmitted to the game device through the network by using the communication function held by the smart device.

3. The step detection unit according to claim 1, wherein the step information reception unit has a structure in which the sides are formed of independent parts and coupling portions of the parts of the respective sides are coupled by hinges, the structure is deformable to a linear shape or an L-shape, and in a case where the shape is changed to the linear shape, each of the sensing regions does not interfere with the sensing region of another area.

4. The step detection unit according to claim 2, wherein the step information reception unit has a structure in which the sides are formed of independent parts and coupling portions of the parts of the respective sides are coupled by parts or contacts, for example, hinges, the structure is deformable to an optional shape such as a linear shape and an L-shape, and in a case where the shape is changed to the linear shape, each of the sensing regions does not interfere with the sensing region of another area.

5. The step detection unit according to claim 2, wherein a lens is mounted on each of the sensors provided on the sides of the outer peripheral portion of the step information reception unit to converge the sensing region in a vertical direction and to form the sensing region close to a linear shape as viewed from a side, in an area where the player steps, thereby realizing step detection with high accuracy by inexpensive parts.

6. The step detection unit according to claim 3, wherein a lens is mounted on each of the sensors provided on the sides of the outer peripheral portion of the step information reception unit to converge the sensing region in a vertical direction and to form the sensing region close to a linear shape as viewed from a side, in an area where the player steps, thereby realizing step detection with high accuracy by inexpensive parts.

7. The step detection unit according to claim 4, wherein a lens is mounted on each of the sensors provided on the sides of the outer peripheral portion of the step information reception unit to converge the sensing region in a vertical direction and to form the sensing region close to a linear shape as viewed from a side, in an area where the player steps, thereby realizing step detection with high accuracy by inexpensive parts.

8. A step detection unit comprising: a step information reception unit having a polygonal housing disposed on a floor surface or a ground surface, the housing including one or more sensors provided on each side of an outer peripheral portion of the housing to define sensing regions extending within predetermine ranges from the sensors; wherein a lens is mounted on each of the sensors provided on the sides of the outer peripheral portion of the step information reception unit to converge the sensing region in a vertical direction and to form the sensing region into a linear shape as viewed from a side, in an area where the player steps; and wherein the lens is configured to narrow the sensing region in the vertical direction such that the sensing region is physically limited to a region adjacent to the floor surface or the ground surface, thereby preventing detection of a foot that is not in contact with the floor surface or the ground surface.

* * * * *